United States Patent [19]

Kodaira et al.

[11] 4,024,367

[45] May 17, 1977

[54] ROCKER SWITCH WITH SLIDABLE INDICATOR

[75] Inventors: Yasuo Kodaira; Nobuo Misaki, both of Tokyo, Japan

[73] Assignee: Nihon Kaiheiki Industrial Company, Ltd., Tokyo, Japan

[22] Filed: Aug. 28, 1975

[21] Appl. No.: 608,739

[30] Foreign Application Priority Data

Sept. 13, 1974 Japan ............... 49-109754[U]
Oct. 9, 1974 Japan ............... 49-121152[U]

[52] U.S. Cl. .................... 200/308; 116/124 L; 200/315

[51] Int. Cl.² ........................................ H01H 9/16

[58] Field of Search .......... 200/308, 315, 330, 339; 116/124 L

[56] References Cited

UNITED STATES PATENTS

| 3,538,285 | 11/1970 | Orts | 200/308 |
| 3,885,116 | 5/1975 | Kodaira | 200/308 |
| 3,928,743 | 12/1975 | Ohashi | 200/308 |

Primary Examiner—James R. Scott
Attorney, Agent, or Firm—Pierce, Scheffler & Parker

[57] ABSTRACT

An electric switch having a case, an actuator and a converter. The actuator and converter are coaxially connected, and below the actuator there is mounted an indicating member with a surface bearing a pre-determined indication, which surface moves in the reverse direction to the formerly-named members relative to the switch.

13 Claims, 17 Drawing Figures

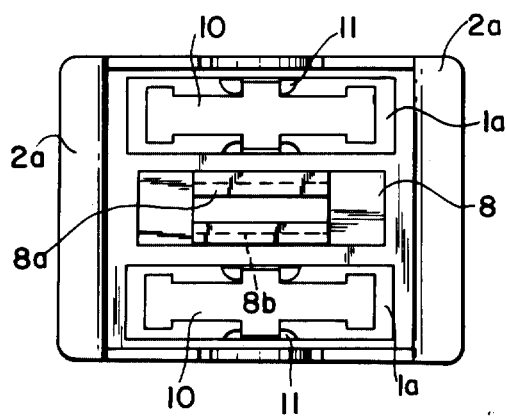
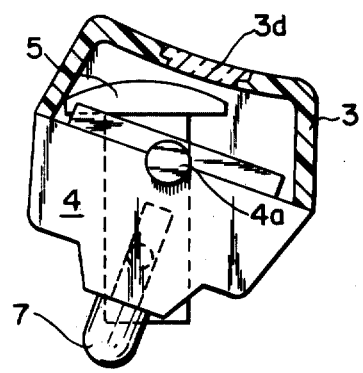
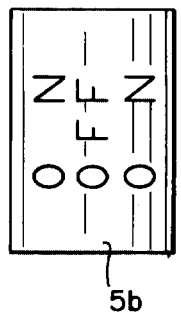
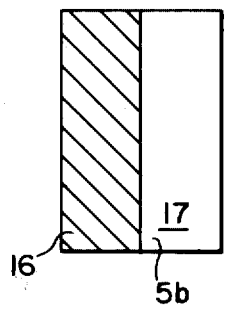
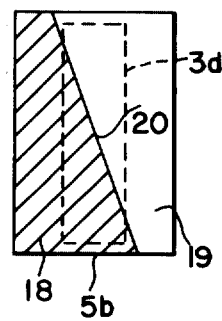
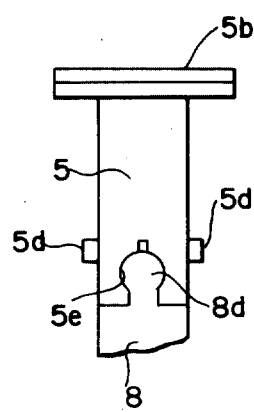
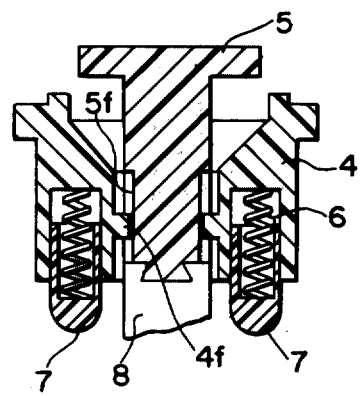

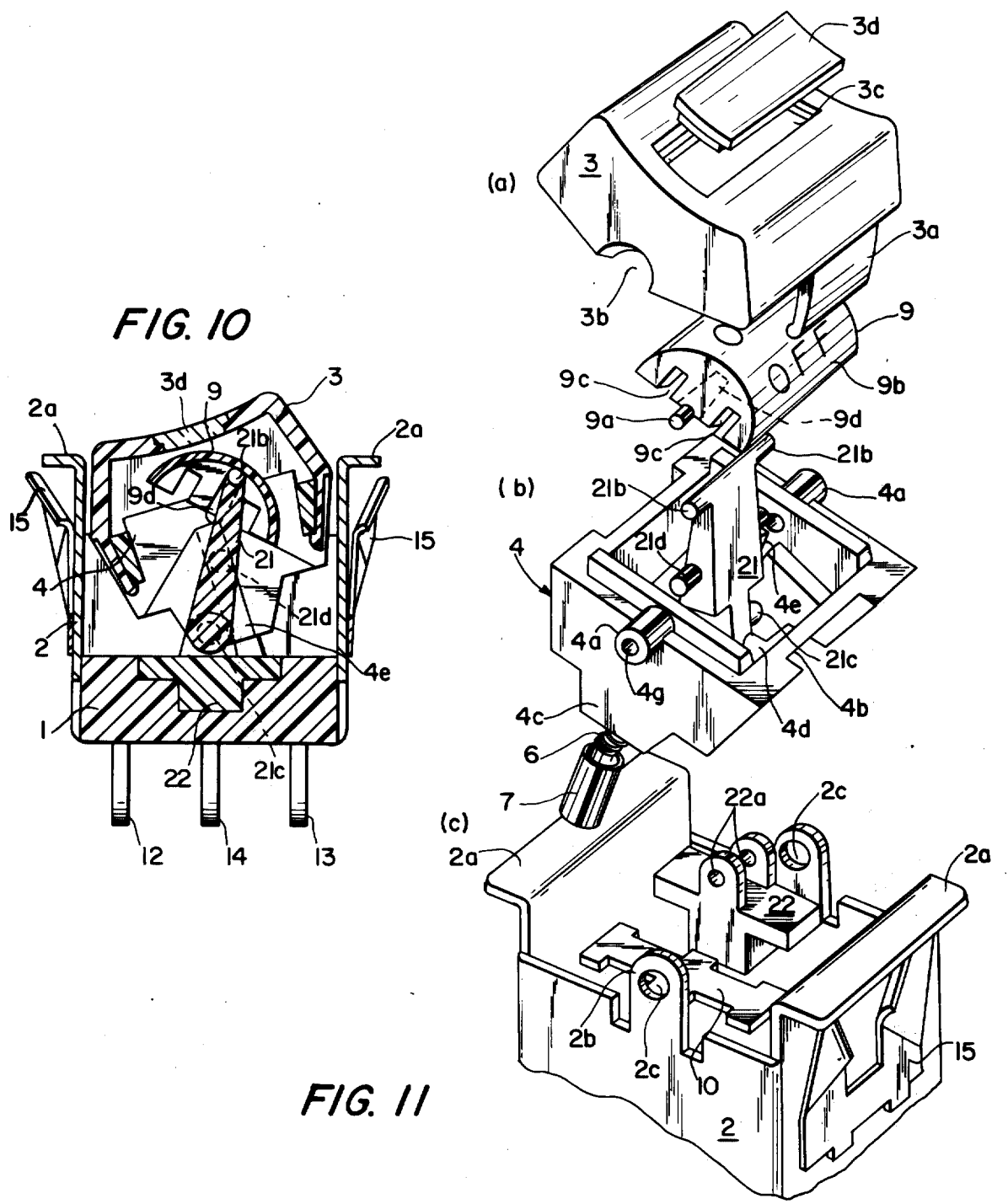

ROCKER SWITCH WITH SLIDABLE INDICATOR

DETAILED EXPLANATION OF INVENTION

The present invention relates to electrical switches, and is concerned with the construction of a switch in which a rockable switch actuator and an indicating member disposed thereunder are caused to be moved mutually in reverse directions relative to the switch case, whereby the areas of an indicating window on the upper surface of the actuator and the indicating portion on the upper surface of the indicating member can be taken larger for a constant amount of movement of the actuator so that the indication can be made clearer. To this end, previously such a construction was devised that the switch actuator and the converter for operatively converting contacts-mechanism were mounted at upper and lower positions and those both were interconnected by a lug-and-recess engagement so as to rock mutually in reverse directions, but in this construction since the two shafts are disposed separately in the upper-and-lower relation, such defect is unavoidable that the height of the switch becomes increased.

The present invention has its object to improve the above-stated feature and to reduce the size of switch of this kind. The essential novelty resides, briefly speaking, in coaxially connecting the actuator and the converter and providing below the actuator an indicating member having an indicating surface which latter is moved in the reverse direction to the former two relative to the switch case.

The invention will now be described in detail and with reference to the accompanying drawing, in which FIG. 1 is a sectional front view of a switch according to the invention;

FIG. 3 is a plan view of its lower half portion;

FIG. 4 is a front view of an essential portion after being operated;

Figure 1:
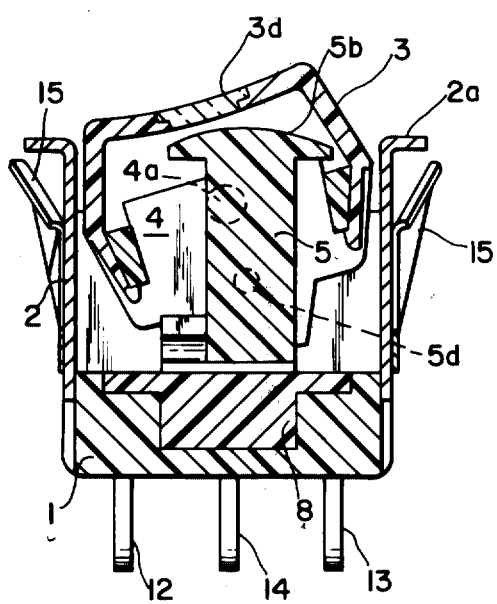
Figure 12:
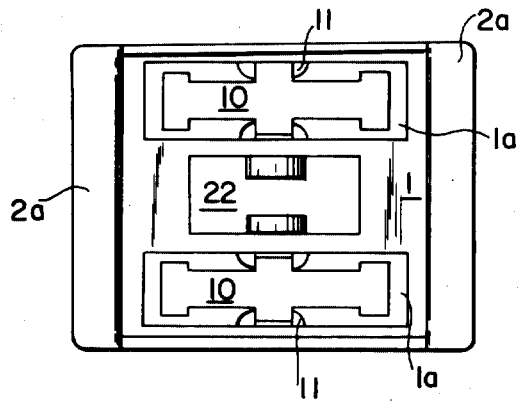
Figure 13:
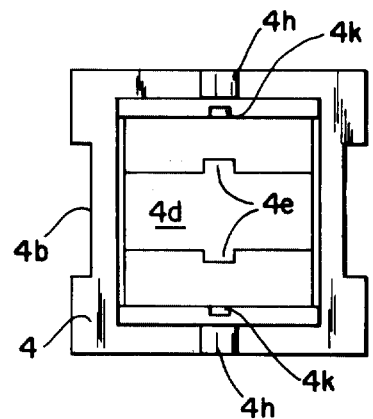
Figure 14:
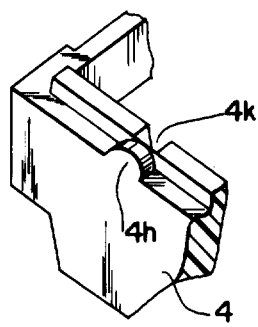
Figure 15:
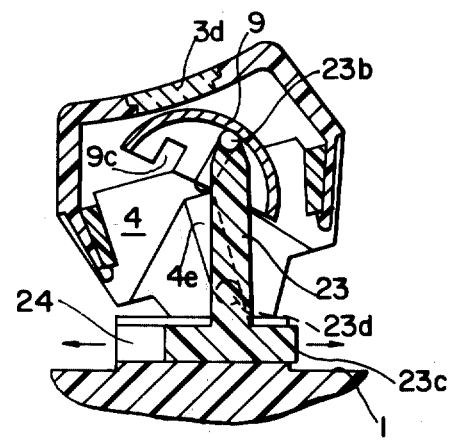
Figure 16:
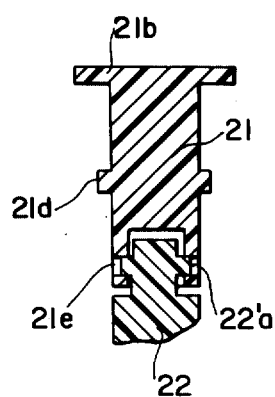
Figure 17:
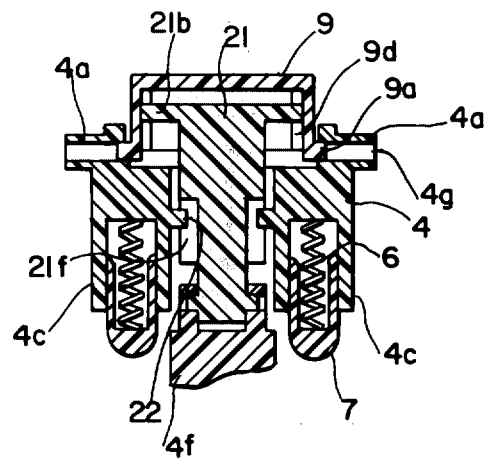

FIGS. 5 to 7 inclusive are plan views showing three different modifications of the indicating surface;

FIGS. 8 and 9 are side views each of modifications of two different essential portions of the embodiment shown in FIG. 1;

FIG. 10 is a sectional front view of a modification of the switch shown in FIG. 1;

FIG. 11 is its exploded perspective view;

FIG. 12 is a plan view of its lower half portion;

FIGS. 13 and 14 are of a portion of the embodiment illustrated in FIG. 10;

FIG. 15 is a sectional front view of an essential portion of another embodiment of the invention; and FIGS. 16 and 17 are side views of each modification of two different essential portions.

FIG. 1 shows an embodiment of the present invention, in which there is shown a switch base body 1 and a cover member 2, these being connected together, as shown in FIG. 2c, in the upper and lower relation constitute a switch case. An actuator 3 is shown as having a wave-formed bottom. A converter 4 is connected with said actuator as one body, the same being mounted left-and-right rockably on the cover member 2. An indicating member 5 is slidably mounted left-and-right on the base body 1.

The base body 1 is provided on its upper surface, — as shown in FIG. 3, — with a pair of front and rear laterally elongated recesses 1a, each of which has contained therein a board-shaped movable contact member 10 left-and-right rockably in seesaw fashion. Beneath the left and right portions of movable contact member 10 there are disposed stationary contacts from which project downwardly terminal pieces 12 and 13 (FIG. 1), respectively, and projecting downwards from a central support member 11 for the movable contact member 10 there is provided a central terminal 14. The cover member 2 is provided at its left and right upper ends with flanges 2a, beneath which there are provided resilient plates 15 fixed to cover member 2 at its left and right side surfaces. Those plates are utilized cooperatively for mounting the subject switch on a panel surface by inserting the switch into a bore of the panel.

The converter 4 is shaped like a rectangular box as shown in FIG. 2b, and on its front and rear surfaces each at the upper-end central portion is formed with a short projecting shaft 4a. Opposed thereto, as shown in FIG. 2c, in a rising piece 2b provided centrally on the upper end of each of front and rear surfaces of cover member 2 there is opened a hole 2c, and by inserting shafts 4a into the holes utilizing the resiliency of rising pieces 2b the converter 4 is rockably mounted on cover member 2. The actuator 3 is provided at its left and right sides centrally on the lower ends, as shown in FIG. 2a, each with a board-shaped depending piece 3a, and by resiliently engaging an inwardly directed pawl portion, formed at its lower end with the corresponding lower end surface of a recess 4b of converter 4, as shown in FIG. 1, the actuator 3 is detachably connected to the converter 4 as one body. The recess 3b formed centrally on the lower end of each of front and rear surfaces of actuator 3 covers over the short shaft 4a. Thus, the actuator 3 and converter 4 are rockable as one body about shafts 4a relative to the switch case.

Alternatively, actuator 3 and converter 4 may be connected as one continuous body, but in view of practice the above stated detachable connection is more convenient.

Each of the front and rear portions of converter 4 has a thickness corresponding to front and rear recesses 1a on the upper surface of base body 1, and they are provided downwards from their lower end surfaces centrally each with a projecting portion 4c, a plunger 7 being inserted into a recess formed on its lower end surface with the intervention of spring 6. The plunger 7 is placed on each movable contact member 10 (FIG. 3) and hence travels left-and-right on the member 10 while being pressed by spring 6 in response to the rocking of actuator 3. Each time it passes over the central support 11 the movable contact member 10 is quickly inverted left-and-right to perform the change-over switching of contacts.

The indicating member 5 is inserted into a bore 4d of the box-shaped converter 4 and the upper surface 5b of its indicating portion 5a enlarged to the front and rear and to the left and right is utilized as an indicating surface. That is, in FIG. 2b, letters ON and OFF are noted separately in the left and right sections. In order to slide the indicating member 5 to the left and right it (member 5) is formed at its lower end with a laterally elongated column-shaped projection 5c. Correspondingly, the base body 1 is provided on its upper surface centrally between the front and rear portions (FIG. 3) with a rectangular recess, into which a receiving member 8 for the indicating member is fitted at its lower half portion as shown in FIG. 1. The upper portion of receiving member 8 is divided into two front and rear pieces 8a leaving a space therebetween, and on their mutually confronting surfaces there are formed left-and-right elongated semicircular grooves 8b. By fitting the above-mentioned projection 5c into these grooves the indicating member 5 is situated in the left-and-right slidable relation relative to the receiving member 8. The latter is provided at its lower half portion on the left and right side surfaces with vertical line-shaped notches 8c, the object of which is to enforce the fitting of member 8 to base body 1.

Corresponding to the indicating member 5, centrally on the upper surface of actuator 3 there is opened a rectangular window hole 3c, into which a transparent plate 3d of the same shape is fitted. On the other hand the actuator 3 is made of opaque material. The indicating member 5 is disposed so that its upper end indicating surface 5b comes under and in proximity to the window hole 3c, thus the indication such as ON and OFF on the indicating surface can be seen from above through window hole 3c. Alternatively, the transparent plate 3d may be omitted with the window hole 3c left open. Further, alternatively, instead of opening the window hole 3c, the entire actuator 3 may be made of transparent material, with the surface of the portion around the window hole 3c, except only the latter opening, being covered with opaque film.

In order to interconnect the indicating member 5 and converter 4, the indicating member 5 is provided on its front and rear surfaces each with a pin-shaped projection 5d, and correspondingly the converter 4 is provided in its bore on the front and rear surfaces each with a vertical recess or groove 4e, the projection 5d being slidably fitted into the groove 4e. The shaft 4a being the center of rotation of actuator 3 and converter 4 being situated at the upper end of converter 4, while the groove 4e and projection 5d are situated below the shaft 4a, therefore when actuator 3 is rocked left-and-right, the upper surface portion of actuator 3 and the groove 4e or projection move mutually in reverse directions.

Since the indicating member 5 is made so as to slide left-and-right relative to receiving member 8, the result is that the window hole 3c and the indicating surface 5b disposed thereunder in close proximity move mutually in reverse directions relative to stationary portions of the switch. Thus, in FIG. 1 — which illustrates the situation where the actuator 3 is inclined left-downwards and correspondingly the indicating member 5 is situated at the right end position, now when the actuator 3 is pushed on its upper right side to incline it right-downwards the grooves 4e on the internal surfaces of converter 4 rotate to the left, and the projections 5d being pushed by them also move to the left, and hence the indicating member 5 also moves to the left, at last attaining to the status shown in FIG. 4. In FIG. 1, the left half portion of indicating surface 5b confronts transparent window 3d, while in FIG. 4 the right half portion of the indicating surface confronts the window 3d. Correspondingly, on the left half portion of indicating surface 5b is noted ON, while on the right half portion is noted OFF.

In comparing the case (1) in which (as mentioned above) the indicating surface moves in the reverse direction to the movement of the window with the case (2) in which, as in the prior art, the indicating surface is fixed with the window only being moved, if it is assumed that in both cases the width of the window (in the left-and-right directions) or the width of each half side of the indicating surface is mutually equal, the inclination angle necessary for the actuator in the former case becomes a half that in the latter case. Therefore, if it is assumed that in both cases the inclination angle of the actuator is mutually equal, the width of the window or that of each half side of the indicating surface in the former case can be taken twice that in the latter case, making the indication of ON and OFF to be very clear, even in a small sized switch.

Although in the above-mentioned embodiment there is illustrated an embodiment wherein the left-downwards inclined position of actuator 3 (FIG. 1) is ON and the right-downwards inclined position is OFF, it is also possible that the central position is made OFF and both of the left and right inclined positions are made ON. FIG. 5 shows the indicating surface 5b in such embodiment. In this case, according to the present invention, since as to the same inclination angle the width of the indicating surface can be made larger, it becomes easily possible to note three letters in parallel. Further, although in FIG. 2 the indication on the indicating surface 5b is made by such letters as ON and OFF, it may be changed to a distinction by different colors as shown in FIG. 6. That is, in FIG. 6, the left half oblique-lines portion 16 is made, say, red while the right half portion 17 is made blue. Furthermore, FIG. 7 shows such a case that in a switch having, similarly to the case shown in FIG. 5, three positions ON-OFF-ON they are indicated by different colorings, wherein the left red portion 18 and the right blue portion 19 are divided by an oblique line 20. Therefore, in the OFF position as shown where the window 3d is situated just at the center of indicating surface 5b, red and blue colors are seen in halves from the window, while when the window 3d travels to the left as in FIG. 1 only red color of the left half portion 18 is seen, and when it travels to the right as in FIG. 4 only blue color of the right half portion 19 is seen.

Figure 2:
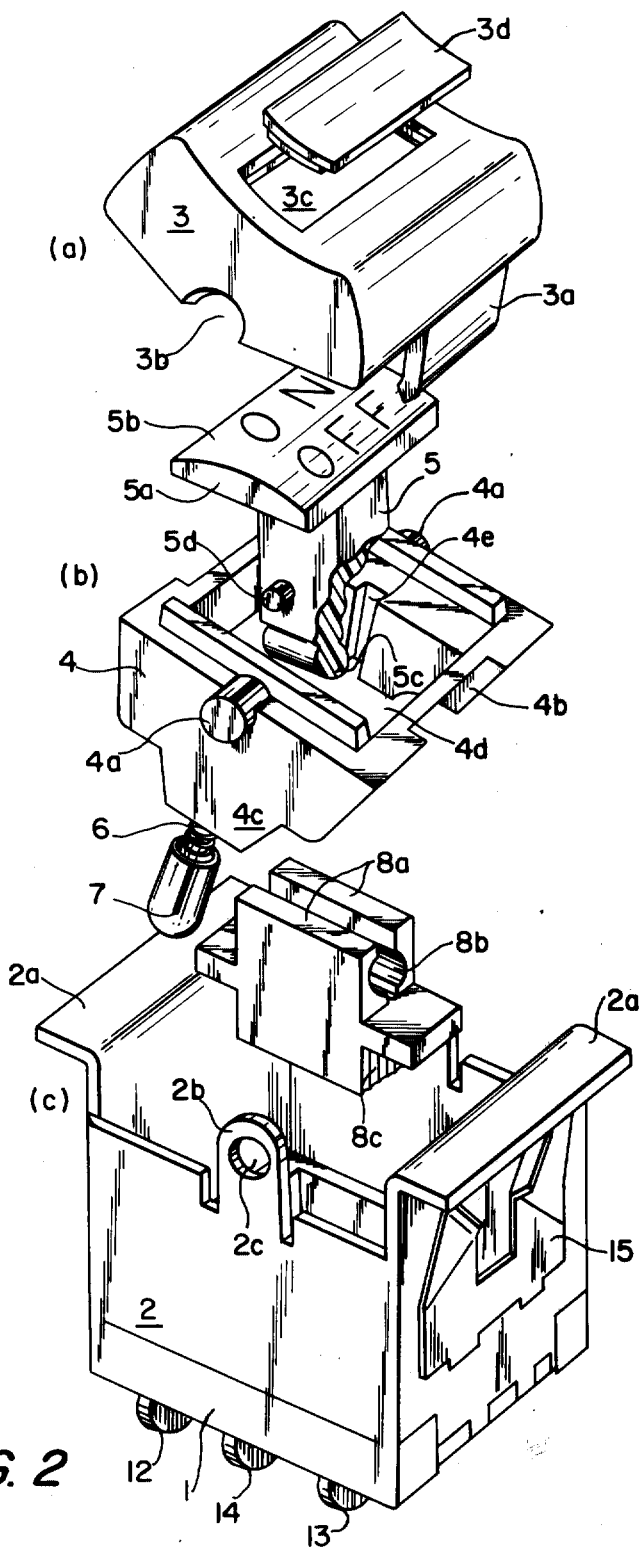
FIG. 2 is its exploded perspective view.

Whereas in FIG. 2 the indicating member 5 is provided on its lower end with projection 5c and the receiving member 8 is provided with grooves for receiving it, FIG. 8 shows another embodiment in which the relation of lug and recess as mentioned above is reversed. That is, the receiving member 8 is provided with a column-shaped projection 8d and the indicating member 5 is provided with a recess 5e for receiving it. Further, FIG. 9 shows an embodiment wherein the lug and recess relation of projection 5d and vertical groove 4e in FIG. 2 is reversed. That is, the converter 4 is provided on its mutually confronting inner surfaces with pin-shaped projections 4f and, — so as to receive them, — indicating member 5 is provided on both its sides with vertical grooves 5f, and they are lug-and-recess engaged in a slidable relation. It is noted that in FIG. 9 the lug-and-recess engagement of the lower end of indicating member 5 and the receiving member is changed from the column-shaped relationship shown in FIG. 2 to a wedge-shape.

Although the above-mentioned embodiments concern a rocker switch having a wave-formed bottom, the present invention is not limited thereto, but can be applied to other kinds of switch such as a lever switch and the like. For example, instead of transparent plate 3d a rectangular or similarly-shaped transparent member having an appropriate height may be used with its lower end being fitted to the window hole 3c, whereby there is obtained a lever switch having its handle made by the transparent member. Further, the whole of actuator 3 may be made of transparent material having at its central portion a rising piece serving as a handle, with its requisite portions — except for the central portion — being coated by opaque film whereby the same effect is obtained.

Alternatively, in order to fix converter 4 to cover member 2, instead of inserting the shaft 4a into holes 2c of rising pieces 2b, inwards from the central portion of the upper end of each of front and rear plates of cover member 2, there may be projected, at right angles, an arcuate curved piece facing downwards the shaft 4a being received by the lower curved surfaces of the pieces. In this case, since the converter 4 is always urged upward by springs 6, only receiving the upper surfaces of shaft 4a suffices to support it. Further, instead of the above-mentioned arcuate pieces, inwards from the upper end of each of front and rear plates of cover member 2 there may be formed a piece bent at right angles having a recess at its central portion, the shaft being received by the recesses. Furthermore, instead of the shafts 4a being projected from front and rear surfaces of converter 4, only semi-circular, upwardly projecting, portions may be provided centrally on the upper surfaces of the front and rear box portions, the cover member being provided at its front and rear plates with two planar pieces projecting inwardly from the upper end of each of the plates thereby leaving a proper space therebetween, the above-mentioned semi-circular projections being received at the space portions.

Furthermore, instead of letters, colorings or the like borne directly on the surface, the indication on the indicating surface 5b may be a thin piece such as a Scotch name plate provided thereon with those marks being affixed on the surface; or, a separate plate having those marks on its surface may be fitted into a shallow recess on the indicating surface. Still further, instead of the receiving member 8 being made separately from the base member 1, they may be made as a continuous single body. Also, instead of the pin-shaped projection 5d, a pin may be inserted into a hole penetrating front and rear of the indicating member 5.

Still alternatively, instead of the indicating member 5 being mounted slidably to the receiving member 8, the indicating member 5 may be supported rotatably at its lower end in a bearing provided on the receiving member. In this case, since the lug-and-recess engagement such as of projection 5d with vertical grooves 4e is similar as in the above-mentioned embodiment, a substantially similar function is accomplished.

According to the present invention, since the transparent window of the actuator and the confronting indicating surface move mutually in reverse directions, the indicating surface can be made wider for the same amount of movement of the actuator; therefore, the indication of ON and OFF or the like can be easily seen, becoming clearer. In addition, since as to the construction for accomplishing the effect the actuator and the converter are made to rotate coaxially, when compared with the construction in which their axes are separated upper and lower, the height of the switch can be decreased, and hence the switch can be made smaller in size, and also there is realized a switch of this kind with an indicating member relatively simple in construction.

According to a still further modification of the inventive concept, the invention comprises, in addition to the foregoing, the case wherein an indicating member itself is provided separately from a member for actuating it connected with the switch actuator or the converter so as to move in the reverse direction, and the indicating member is made to rotate substantially coaxially with the switch actuator and in the reverse direction.

According to the embodiment about to be described, the indicating member 9 is shaped semi-cylindrically, as shown in FIG. 10, or FIG. 11, and it is rotatably supported on converter 4. To this end, on the indicating member 9 there is formed centrally on each of its front and rear surfaces, at the lower end, a projecting pin 9a, and correspondingly each of the short shafts 4a of converter 4 is provided with an axial bore 4g, the pin 9a being inserted into the bore 4g at its internal end portion, as shown in FIG. 17. To the left and right from pin 9a there is provided each a vertical cutout portion or slot 9c, the object of which is to permit the pin 9a and the surroundings inwardly to yield when the front and rear pins 9a are inserted into bores 4g, thereby to enable their resilient insertion. The upper surface 9b of indicating member 9 is utilizied as an indicating surface; that is, in FIG. 11 letters ON and OFF are noted separately in the left and right portions.

The actuator 21 of indicating member 9 is inserted into the internal bore 4d of the box-shaped converter 4 and is rockably supported at its lower end portion, left-and-right, to base body 1. To this end, a bearing member 22 is, as shown in FIG. 11c, fitted into the surface of base body 1 centrally between its front and rear portion (FIG. 12), and correspondingly the actuator 21 is formed at its lower end portions on the front and rear surfaces with projecting pins 21c, which latter are inserted into bearing bores 22a of bearing member 22. It is noted that the bearing member 22 may be formed continuously as one body with base body 1.

In order to interconnect the indicating member 9 and its actuator 21, the latter is formed at its upper end on the front and rear surfaces with projecting pins 21b, and correspondingly the indicating member 9 is provided on its front and rear back surfaces each centrally with a vertical groove 9d, the pins 21b being slidably inserted into the grooves 9d. When the actuator 21 rotates about its lower end portion, the indicating member 9 is rotated by the engagement of pins 21b with grooves 9d in the same direction, and since the rotational center of indicating member 9 is situated at the central bore 4g of shaft 4a, the pin 21b slides somewhat along the vertical grooves 9d.

Further, the transparent plate 3d may be formed in the shape of a lens, so that the letters, markings or the like are visually enlarged.

In FIG. 10, the actuator 3 is inclined left-downwards and correspondingly the indicating member 9 is inclined right-downwards. Now, when the actuator 3 is pressed on its upper surface at the right side to incline it right-downwards, the grooves 4e on the internal surfaces of converter 4 are rotated to the left, and the pins 21d, by being pushed by them, move also to the left. Therefore, the indicating member actuator 21 rotates to the left. Then its upper end pins 21b rotate the indicating member 9 by the intermediary of grooves 9d to the left, the final result being left-downwards inclined position opposite to that shown in FIG. 10. In the status shown in FIG. 10 the letters ON on the indicating surface 9b are seen through transparent plate 3d, while in the opposite position mentioned above the letters OFF are seen on the indicating surface.

FIGS. 13 and 14 show a modification of the converter 4 of the species shown in FIG. 10. That is, in FIG. 11 the circular short shaft 4a projects outwards, while in FIG. 14 only a semi-circular lug 4h projects upwards. In this case, the cover member 2 is provided at its front and rear portions on the upper end surfaces each with a receiving portion which re-presses the lug 4h from upwards. That is, since the converter 4 is always pushed upwards by spring 6, the existence of whatever receives it from upwards suffices. Further, in FIGS. 14 and 13, instead of bore 4g seen in FIG. 11, a shallow recess 4k is provided, into which recess the pin 9a of indicating member 9 is inserted from upwards. Still alternatively, the projections 9a of indicating member 9 may be omitted, and instead the front and rear surfaces of indicating member 9 are shaped as a downwardly directed triangle, and corresondingly a recess 4k is formed as a V-shaped groove which is adapted to receive the lower acute end of the above-mentioned triangle. In this case, though one might fear is assumed that the indicating member 9 might somewhat chatter up and down, the actuator 3, in the neighborhood of its neutral position where the fear exists, suppresses the upward movement of the indicating member 9, therefore no wrong occurs.

Another embodiment shown in FIG. 15 is such that an actuator 23 of indicating member 9 is made slidable, instead of rotatable, left-and-right. To this end, the actuator 23 is formed at its lower end with a portion 23c of circular or semi-circular column elongated left-and-right as seen in FIG. 15, a wedge or the like, and in order to receive it, the base body 1 is provided on its upper surface with a receiving member 24 having a recess of a shape similar to the portion 23c; the member may be continuous as one body with base body 1, or the member may be fitted into the latter similarly to the bearing member 22 in FIG. 10. The actuator 23 is provided on the front and rear surfaces of its intermediate portion with projecting pins 23d for engaging with vertical grooves 4e of converter 4, and — at its upper end — with projecting pins 23b for engaging with vertical grooves 9d of indicating member 9.

In FIG. 15 when the actuator 3 is pressed on its upper surface toward the right side, it is inclined right-downwards and, at the same time, the vertical grooves 4e of converter 4 rotate towards the left to make the indicating member actuator 23 slide leftwards, by the intermediary of projecting pins 23d, and then its upper end projecting pins 23 cause the indicating member 9 to incline left-downwards by the intermediary of vertical grooves 9d. Therefore, the indicating member 9, similarly as in the former embodiment, rotates in the reverse direction to the actuator 3.

According to a further modification, shown in FIG. 16, the relation of lug-and-recess engagement of actuator 21 and bearing member 22 in FIG. 10 or FIG. 11 is reversed. That is, the actuator 21 is provided at its lower end portion with holes instead of projections, and in order to receive it rotatably a receiving member 22' instead of bearing member 22 is fitted into base body 1 and the projections 22'a on its upper front and rear surfaces are inserted into the holes 21e. In this case, also, the rotational function of actuator 21 is substantially the same as in the former embodiment.

A modification shown in FIG. 17 is such that the relation of lug-and-recess engagement of converter 4 and indicating member actuator 21 is reversed. That is, the converter 4 is provided at its internal surfaces with projections 4f instead of vertical grooves, and the actuator 21 is provided on its front and rear surfaces with vertical grooves 21f instead of projecting pins 21d, the projections 4f being inserted into the vertical grooves 21f up and down slidably. The function of this case also is substantially the same as in the former embodiment.

Furthermore, as a modified construction for mounting the switch, the resilient plates 15 on both sides are omitted, and the switch is fixed by screw fasteners to the panel surface at the portions of both side flanges 2a, said portions being suitably elongated.

According to the invention, in addition to the effects stated hereinabove — with reference to the embodiments in FIGS. 1–9 inclusive — the effect is obtained that since the switch actuator and the indicating member both rotate substantially in a coaxial relation, the space between then is maintained substantially uniform as to all rotational positions of the actuator, thereby the indication is easy to see.

We claim:
1. A switch comprising
a switch case;
a switch actuator;
a converter for causing conversion of switch contacts,
said switch actuator and said converter being connected together and mounted on the switch case rockably about a common axis;
said switch actuator being provided on its upper surface positioned above said common axis with a transparent window; and
an indicating member having an indicating surface disposed under and in proximity to said transparent window and mounted movably in a horizontal direction on the fixed portion of said switch case,
either one of said converter and switch actuator assembly and said indicating member being provided below said common axis with vertical groove means;
the other being provided with projection means so as to be engaged with said vertical groove means;
whereby said transparent window and said indicating surface are caused to move mutually in reverse directions relative to said switch case in accordance with the rocking of said actuator.

2. A switch as defined in claim 1, wherein the switch actuator and the converter are detachably interconnected.

3. A switch as defined in claim 1, wherein a transparent or semi-transparent member is fitted to the window of the switch actuator.

4. A switch as defined in claim 1, wherein said indicating member is provided at its lower end portion with a projection or a groove while the base body of the switch is provided on its upper surface with a groove or a projection, respectively, said projection and said groove being mutually engaged.

5. A switch as defined in claim 4, further characterized in that the switch base body is provided on its upper surface with a separately made member having said projection or said groove.

6. A switch as defined in claim 1, wherein the transparent or semi-transparent portion situated at the center of said switch actuator is shaped as a projection higher than the upper surface of said actuator.

7. A switch as defined in claim 1, according to which the upper surface portion of said switch actuator is formed wholly solid, and its central portion only is made transparent or semi-transparent.

8. A switch as defined in claim 1, wherein said switch actuator consists of two members which are superposed, one of said members being transparent and the other being opaque, the opaque member having a centrally located window.

9. A switch as defined in claim 1, wherein said indicating member is provided directly on its surface with the indication.

10. A switch as defined in claim 1, wherein said indicating member has mounted thereon an indicating piece with applied indication.

11. A switch as defined in claim 1, wherein said converter is provided on both its dies with shafts which are supported in bearing bores of the switch case.

12. A switch as defined in claim 1, wherein said converter is provided on its upper surface centrally on both sides with upwardly projecting lugs, of which the upper surfaces are supported against the lower surfaces of side portions of the switch case.

13. A switch comprising
a switch case;
a switch actuator;
a converter for causing conversion of switch contacts, said switch actuator and said converter being connected together and mounted on the switch case rockably about a common axis;
a transparent window being provided on the upper surface of said switch actuator above said common axis;
an indicating member mounted rotatably on said converter and said switch actuator assembly so that its upper indicating surface is disposed in proximity to said transparent window; and
an indicating member actuator mounted movably in a horizontal direction on the fixed base portion of the switch case;
either one of said converter and switch actuator assembly and said indicating member actuator being provided below said common axis with first vertical groove means;
the other being provided with first projection means so as to be engaged with said first vertical groove means;
either one of said indicating member and said indicating member actuator being provided above said common axis with second vertical groove means;
the other being provided with second projection means so as to be engaged with said second vertical groove means;
whereby said transparent window and said indicating surface are caused to move mutually in reverse directions relative to said switch case in accordance with the rocking of said switch actuator.

* * * * *